(12) United States Patent
Hadley et al.

(10) Patent No.: US 8,856,134 B2
(45) Date of Patent: Oct. 7, 2014

(54) AIRCRAFT MAINTENANCE DATA RETRIEVAL FOR PORTABLE DEVICES

(75) Inventors: Brent L. Hadley, Kent, WA (US); Patrick J. Eames, Newcastle, WA (US)

(73) Assignee: The Boeing Company, Chicago, IL (US)

(*) Notice: Subject to any disclaimer, the term of this patent is extended or adjusted under 35 U.S.C. 154(b) by 815 days.

(21) Appl. No.: 12/118,037

(22) Filed: May 9, 2008

(65) Prior Publication Data
US 2009/0281993 A1 Nov. 12, 2009

(51) Int. Cl.
G06F 17/30 (2006.01)
G06Q 10/06 (2012.01)

(52) U.S. Cl.
CPC .......... *G06F 17/30011* (2013.01); *G06Q 10/06* (2013.01)
USPC .......................................................... 707/741

(58) Field of Classification Search
CPC ................................................ G06F 17/30011
USPC ........................................................ 707/705
See application file for complete search history.

(56) References Cited

U.S. PATENT DOCUMENTS

| | | | | |
|---|---|---|---|---|
| 5,778,381 A * | 7/1998 | Sandifer | ...................... | 701/29.1 |
| 6,181,992 B1 * | 1/2001 | Gurne et al. | .................... | 701/29 |
| 6,487,479 B1 * | 11/2002 | Nelson | ...................... | 701/29.1 |
| 6,574,537 B2 * | 6/2003 | Kipersztok et al. | ............. | 701/29 |
| 6,633,801 B1 * | 10/2003 | Durlacher et al. | ................ | 701/9 |
| 6,671,593 B2 * | 12/2003 | Sinex | .......................... | 701/29.4 |
| 6,714,846 B2 * | 3/2004 | Trsar et al. | ................... | 701/34.3 |
| 6,795,758 B2 * | 9/2004 | Sinex | ........................... | 701/29.4 |
| 7,275,049 B2 | 9/2007 | Clausner et al. | | |
| 7,835,691 B2 * | 11/2010 | Groskreutz et al. | ......... | 455/12.1 |
| 7,869,906 B2 * | 1/2011 | Louch et al. | ...................... | 701/1 |
| 8,676,567 B2 * | 3/2014 | Hollingsworth | .................. | 704/9 |
| 2002/0095476 A1 * | 7/2002 | Craik | ........................... | 709/217 |
| 2002/0138184 A1 * | 9/2002 | Kipersztok et al. | ............. | 701/29 |
| 2002/0138185 A1 * | 9/2002 | Trsar et al. | ...................... | 701/33 |
| 2002/0174112 A1 * | 11/2002 | Costantino | ........................ | 707/3 |
| 2002/0188494 A1 * | 12/2002 | Budnik et al. | .................... | 705/9 |
| 2003/0055625 A1 * | 3/2003 | Korelsky et al. | .................. | 704/9 |

(Continued)

FOREIGN PATENT DOCUMENTS

EP 1 276 058 A 1/2003
EP 1 321 864 A 6/2003

OTHER PUBLICATIONS

U.S. Appl. No. 11/673,685, filed Feb. 12, 2007, Jeffrey Kollgaard.
U.S. Appl. No. 12/118,055, filed May 9, 2008, Brent Hadley.

*Primary Examiner* — Alexey Shmatov
*Assistant Examiner* — Hubert Cheung
(74) *Attorney, Agent, or Firm* — Haynes and Boone, LLP

(57) ABSTRACT

In accordance with one or more embodiments, a system for facilitating transfer of data and information over a network includes a database component, a communication component adapted to communicate with a user via a portable communication device over the network, and a processing component adapted to receive a request for data and information from the user via the portable communication device over the network and process the request by accessing one or more documents from the database component related to at least one component of a machine specified by the user passed with the request. The communication component transfers the one or more documents from the database component to the portable communication device for viewing by the user.

14 Claims, 8 Drawing Sheets

(56) References Cited

U.S. PATENT DOCUMENTS

| | | | |
|---|---|---|---|
| 2003/0233178 A1* | 12/2003 | Sinex | 701/29 |
| 2004/0138792 A1* | 7/2004 | Foxford et al. | 701/29 |
| 2005/0154500 A1* | 7/2005 | Sonnenrein et al. | 701/1 |
| 2005/0283369 A1* | 12/2005 | Clausner et al. | 704/275 |
| 2008/0167758 A1* | 7/2008 | Louch et al. | 701/2 |
| 2008/0195403 A1* | 8/2008 | Kollgaard | 705/1 |
| 2008/0301152 A1* | 12/2008 | Kollgaard et al. | 707/10 |
| 2009/0276438 A1* | 11/2009 | Lake et al. | 707/10 |
| 2009/0289776 A1* | 11/2009 | Moore et al. | 340/10.41 |
| 2010/0077001 A1* | 3/2010 | Vogel et al. | 707/777 |
| 2010/0256864 A1* | 10/2010 | Ying | 701/33 |
| 2010/0256865 A1* | 10/2010 | Ying | 701/33 |

\* cited by examiner

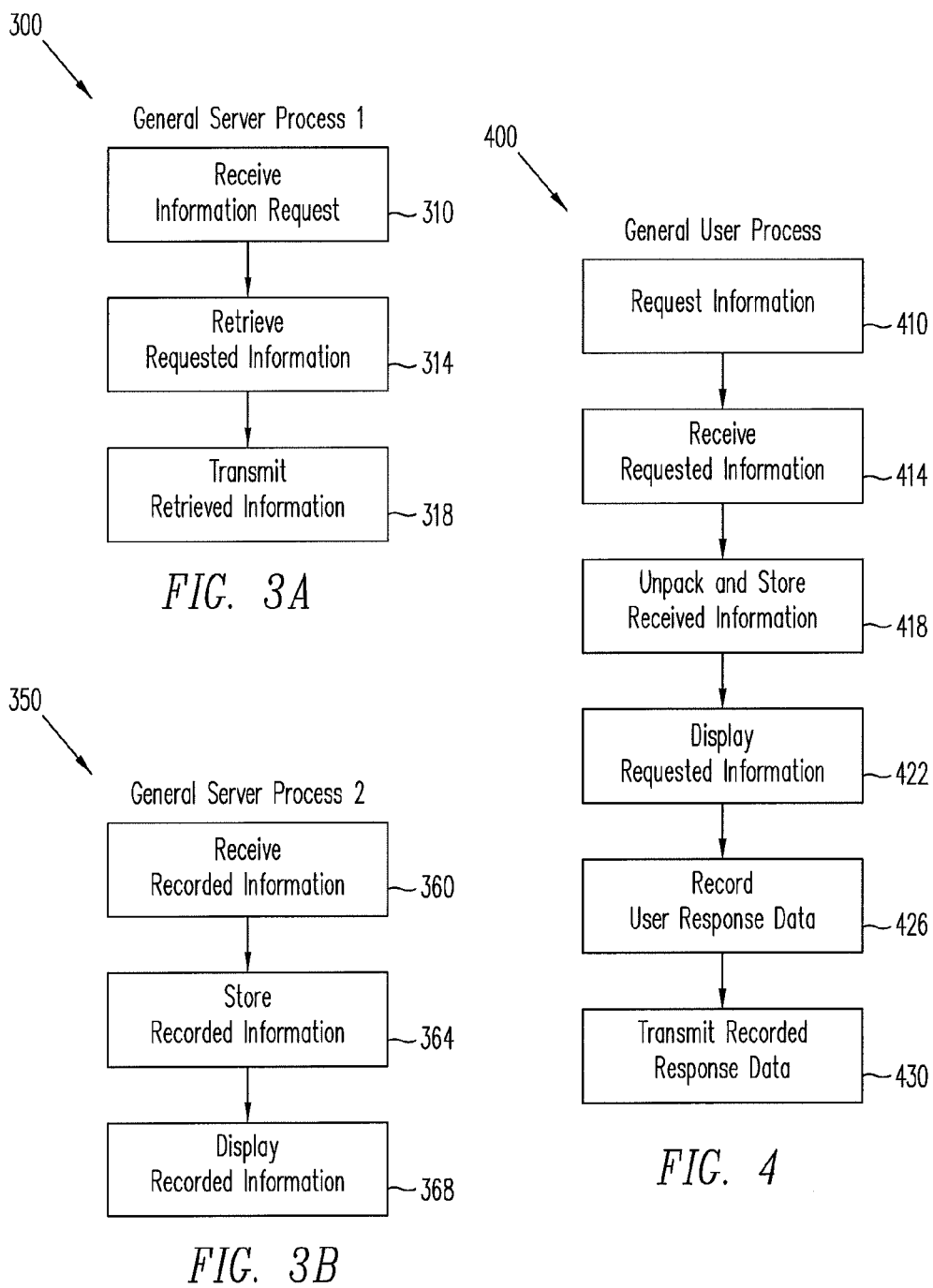

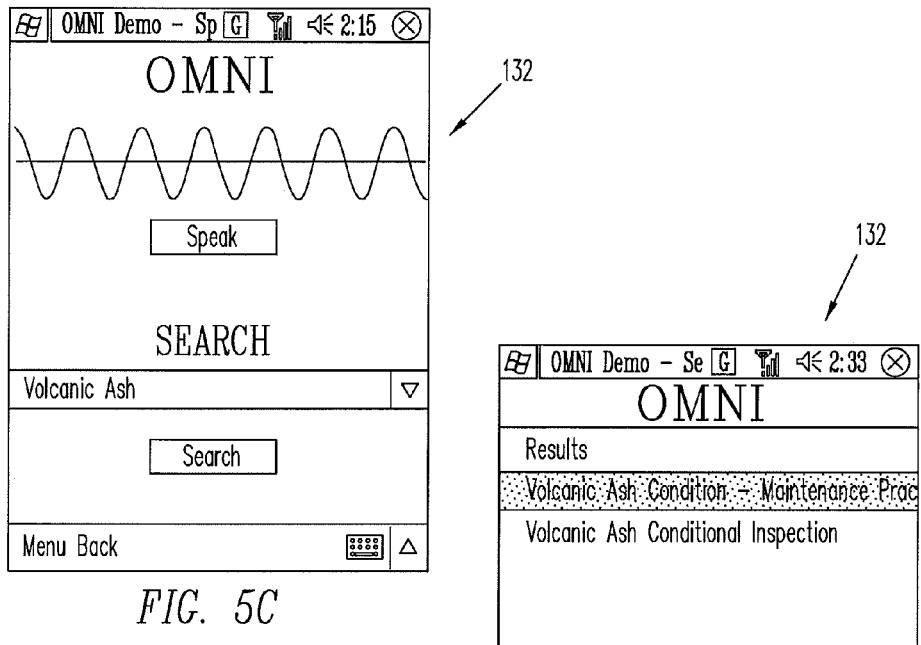
FIG. 5C
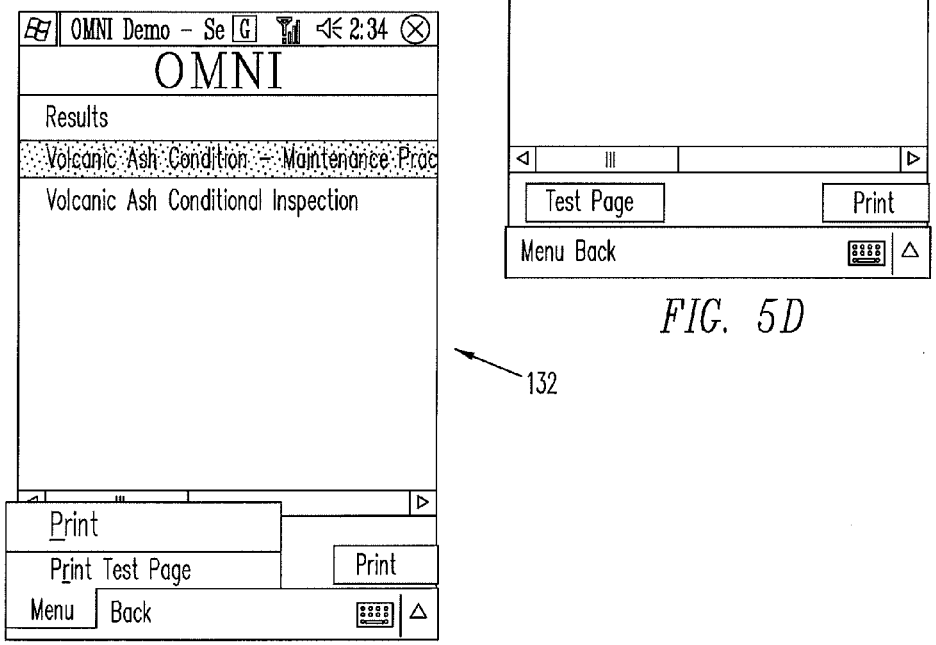
FIG. 5D
FIG. 5E 737-600/700/800/900
AIRCRAFT MAINTENANCE MANUAL F. Do this inspection if one or more of the conditions that follow occur:
  (1) An airplane's flight path went through a cloud of volcanic ash.
  (2) An airplane is covered with volcanic ash during ground operations (towing, taxiing, parking, etc.) during volcanic ash fallout conditions.
    NOTE Fallout is identified as ash drifting down from the air, or is blown about by the wind.
        Fallout is also caused by the ash being blown or moved about because of the movement of airplanes and ramp vehicles.
  (3) An airplane does a landing or takeoff during volcanic ash fallout conditions.
WARNING: DO NOT BREATHE VOLCANIC ASH. DO NOT GET VOLCANIC ASH IN YOUR EYES. PUT ON PROTECTIVE CLOTHES, EYE GOGGLES, AND A RESPIRATOR MASK THAT IS SUFFICIENT TO FILTER VOLCANIC ASH PARTICLES. VOLCANIC ASH CAN CAUSE EYE IRRITATION AND INJURY TO THE RESPIRATORY SYSTEM.
G. Volcanic ash can cause discomfort and injury to persons during fallout conditions.
  (1) Precautions must be followed when you work in a volcanic ash environment. This will prevent the entry of volcanic ash into your eyes and your respiratory (breathing) system.
H. Remove the ash and repair the finish as soon as possible.
TASK 05-51-31-210-801
2. Volcanic Ash Conditional Inspection
A. General
  (1) Inspect the airplane if one of these conditions occur:
    (a) The airplane flight path was through a cloud of volcanic ash.
    (b) Volcanic ash engulfs the airplane while it operates on the ground (towing, taxiing, parking, etc.).
    (c) The airplane lands or takes off in volcanic ash.
B. References

| Reference | Title |
|---|---|
| 12-11-00-650-804 | Drain the Fuel from the Sumps after Defueling (P/B 201) |
| 12-11-00-680-801 | Fuel System Sumping (P/B 301) |
| 12-14-01-600-801 | Potable Water System - Drain (P/B 301) |
| 21-31-03-000-801 | Aft Outflow Valve Assembly Removal (P/B 401) |
| 21-32-01-000-801 | Positive Pressure Relief Valve Removal (P/B 401) |
| 21-32-02-000-801 | Positive Pressure Relief Valve Filter Removal (P/B 401) |
| 21-32-03-000-801 | Negative Pressure Relief Vent Door Removal (P/B 201) |
| 21-51-01-000-802-002 | Left Flow Control and Shutoff Valve Removal (P/B 401) |
| 21-51-01-000-805-002 | Right Flow Control and Shutoff Valve Removal (P/B 401) |
| 21-51-04-000-802-002 | Air Cycle Machine (ACM) Removal (P/B 401) |
| 21-51-12-000-801 | Condenser Removal (P/B 401) |
| 21-51-21-000-801 | Ram Air Inlet Actuator Removal (P/B 401) |
| 21-51-22-000-801 | Ram Air Inlet Deflector Door Removal (P/B 401) |
| 21-51-22-000-802 | Ram Air Inlet Deflector Door Shaft Assembly Removal (P/B 401) |
| 21-51-23-000-801 | Ram Air Inlet Modulation Panels Removal (P/B 401) |
| 24-11-21-000-801 | Integrated Drive Generator (IDG) Air/Oil Cooler Removal (P/B 401) |
| 27-51-00-040-801 | Trailing Edge Flap System Deactivation (P/B 201) |
| 27-51-00-440-801 | Trailing Edge Flap System Reactivation (P/B 201) |

*FIG. 5G*

AIRCRAFT MAINTENANCE DATA RETRIEVAL FOR PORTABLE DEVICES

CROSS-REFERENCE TO RELATED APPLICATIONS

This application is related to Ser. No. 12/118,055, entitled "SYSTEM AND METHOD FOR SERVICE BULLETIN DATA EXCHANGE", filed May 9, 2008, which is incorporated herein by reference in its entirety.

TECHNICAL FIELD

The present disclosure relates generally to data retrieval and, more particularly, to maintenance data retrieval via ultra-portable devices.

BACKGROUND

In the aviation industry, airline companies are provided with advisory service bulletins for facilitating maintenance, repair and service schedules of aircraft. Some of the advisory service bulletins are provided by aircraft manufacturers based on feedback from airline service personnel and are typically prepared for specific aircraft owned by a specific airline company in response to aviation safety standards.

In general, there lacks an efficient approach for reporting and reviewing information regarding the status of aircraft (e.g., damage and/or malfunction) to enable quick dispatch of aircraft repair, service and/or maintenance. Some common approaches involve manually typed information or verbally communicated information, which tends to be cumbersome and time consuming to appropriately identify, locate and provide response. These types of communication approaches do not typically present a technician with quick access to current service procedures or relevant historical information related to specific aircraft.

As a result, there is a need for an improved system and method for providing data and information on aircraft for improved response to field service personnel for maintenance, service and repair decision-making.

SUMMARY

Systems and methods disclosed herein, in accordance with one or more embodiments, provide interactive communication between a user and a network repository server to access appropriate service information about specific aircraft via a portable communication device (e.g., a cell phone or personal digital assistant (PDA)). The systems and methods disclosed herein enables entry and transmittal of aircraft data and information on incidence of damage and/or malfunction, and on actions of advisory service bulletins, to assist a human operator for improved fleet safety management decisions.

In accordance with one or more embodiments of the present disclosure, a system for facilitating transfer of data and information over a network includes a database component, a communication component adapted to communicate with a user via a portable communication device over the network, and a processing component adapted to receive a request for data and information from the user via the portable communication device over the network and process the request by accessing one or more documents from the database component related to at least one component of a machine specified by the user passed with the request. The communication component transfers the one or more documents from the database component to the portable communication device for viewing by the user.

In various implementations, the portable communication device comprises a display component that displays the one or more documents, a portable database component for storage of the one or more documents and information related to the machine or at least a component of the machine, and a user input component that receives input from the user including data and information related to the one or more documents.

In one embodiment, the machine comprises an airplane, and the one or more documents comprise at least one of a service bulletin and a service manual related to the airplane. The one or more documents stored in the portable database component of the portable communication device provides the user with guided interactive inspection of the machine or at least a component of the machine by viewing topics in the one or more documents that are selectively searchable based on input by the user. The topics are selectively searchable by the user input, which may include at least one of a part number, a part description and a keyword. The user input may be stored in the portable database component and transferred to the system for storage in the database component. The user input includes user answers to questions and one or more recorded results to the questions are stored in the portable database component and transferred to the system for storage in the database component.

In accordance with another embodiment of the present disclosure, a method for facilitating transfer of data and information over a network includes communicating with a user via a portable communication device over the network, receiving a request for data and information from the user via the portable communication device over the network, processing the request by accessing one or more documents from a database component related to at least one component of a machine specified by the user passed with the request, and transferring the one or more documents from the database component to the portable communication device for viewing by the user.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3A shows a block diagram of a method for providing service information to a user, in accordance with an embodiment of the present disclosure.

FIG. 3B shows a block diagram of a method for receiving archival information from a user, in accordance with an embodiment of the present disclosure.

FIG. 4 shows a block diagram of a method for viewing service information by a user, in accordance with an embodiment of the present disclosure.

FIGS. 5A-5F show various implementations of the method of FIG. 4.

FIG. 5G shows a portion of data and information that may be printed or viewed by a user, in accordance with an embodiment of the present disclosure.

Embodiments and their advantages are best understood by referring to the detailed description that follows. It should be appreciated that like reference numerals are used to identify like elements illustrated in one or more of the figures.

DETAILED DESCRIPTION

In accordance with one or more embodiments, systems and methods disclosed herein provide for directing interactive communication between a user and a server having a service bulletin repository and/or database for appropriate service information responses and to transmit service entries referring to machinery (e.g., an airplane) to a service provider (e.g., a centralized service operation system) via a portable communication device (e.g., a cell phone or PDA). In accordance with one or more embodiments, systems and methods disclosed herein enable convenient entry and transmittal of data and information on the status of machinery (e.g., incidence of certain types of damage and/or malfunctions) and on service bulletin actions to assist the user (e.g., field service personnel) with entry of status data and information and with making maintenance decisions.

Figure 1:
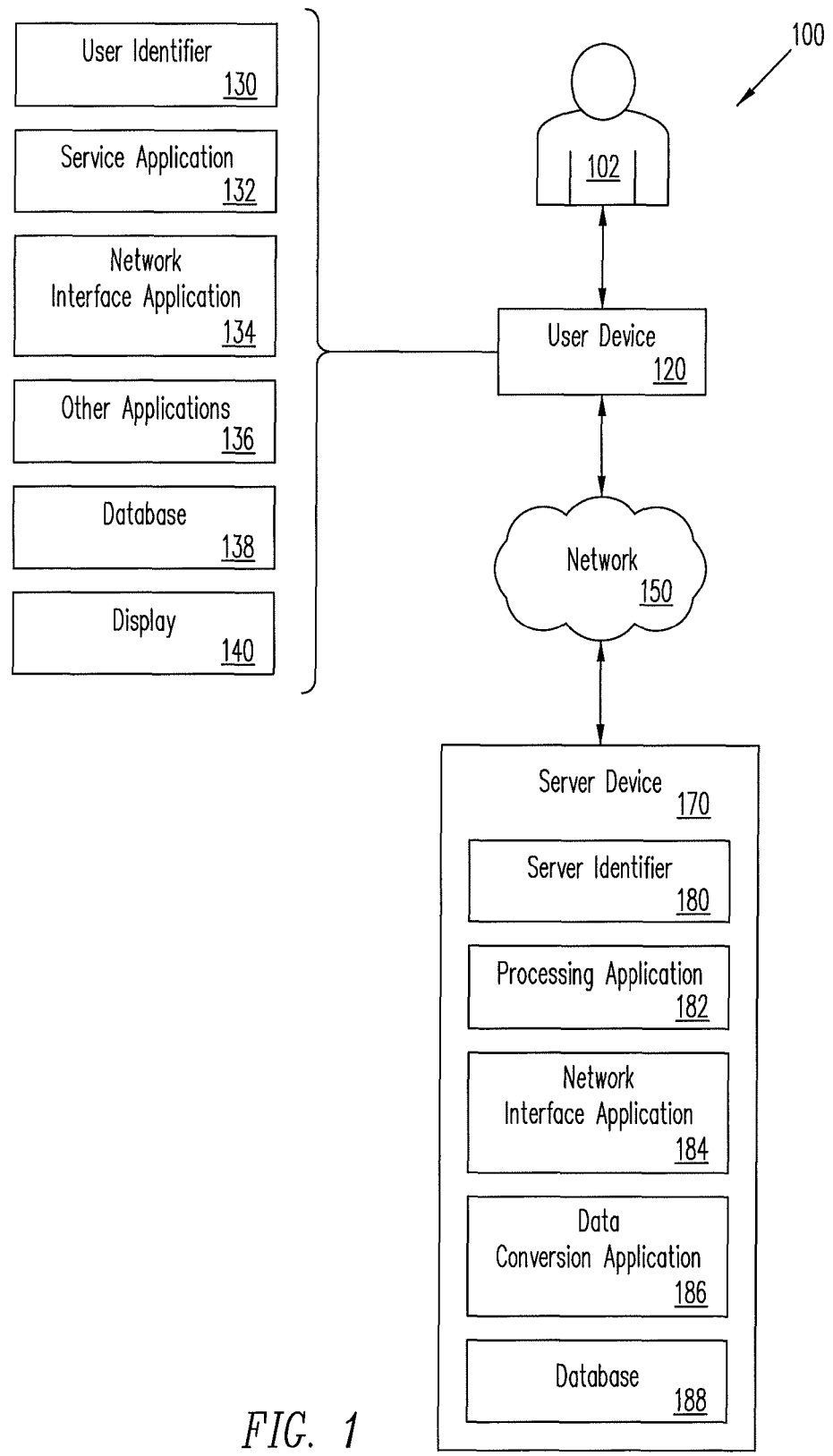
FIG. 1 shows a block diagram of a system configured to transfer service data and information over a network, in accordance with an embodiment of the present disclosure.

FIG. 1 shows one embodiment of a block diagram of a system 100 (e.g., an interactive communication system) configured to transfer service data and information over a network 150. As shown in FIG. 1, the system 100 includes at least one user device 120 configured to interface with a user 102 and at least one server device 170 configured to communicate with the user device 120 via the network 150.

The network 150, in one embodiment, may be implemented as a single network or a combination of multiple networks. For example, in one embodiment, the network 150 may comprise a wireless telecommunications network (e.g., cellular phone network) adapted to communicate with other communication networks, such as the Internet. In various other embodiments, the network 150 may include the Internet and/or one or more intranets, landline networks, wireless networks, and/or other appropriate types of communication networks adapted to communicate with a wireless telecommunications network.

The user device 120, in various embodiments, comprises a mobile communication device, such as a cell phone, a personal digital assistant (PDA), or various other generally known types of mobile computing devices. The user device 120 may be implemented using any appropriate combination of hardware and/or software configured for wired and/or wireless communication over the network 150.

The user device 120, in one embodiment, may include one or more user identifiers 130, which may be implemented as operating system registry entries, identifiers associated with hardware of the user device 120, or various other appropriate identifiers. The user identifier 130 may include attributes related to the user 102, such as security information (e.g., user name, password, photograph image, biometric id, address, phone number, etc.). In various implementations, the user identifier 130 may be passed with a user service request to the server device 170, and the user identifier 130 may be used by the server device 170 to provide the user 102 with access to service data and information stored by the server device 170, in a manner as described herein.

The user device 120, in one embodiment, includes a service application 132 that may be used by the user 102 to access and/or browse service data and information made available to the user 102 by the server device 170 over the network 150. For example, the service application 132 may be implemented as a network browser to display service data and information (e.g., documents and/or files related to an advisory service bulletin, a service manual or service instructions) provided by the server device 170 over the network 150.

In one implementation, the service application 132 processes relevant service data and information to provide an interactive process to guide the user 102 through service and maintenance activities. The service application 132 may generate one or more records of the responses to tests, recordings, evaluations and/or assessments made by the user 102 and stores the one or more records in a local memory component, such as database 138.

In one implementation, the service application 132 provide portable access to large information data sets necessary to operate and maintain machinery, such as a commercial airplane. The service application 132 indexes and stores one or more complete manual sets necessary to maintain machinery. The manual data sets may comprise one to several million pages in printed document format. As described in greater detail herein, service manual data sets may be retrieved from the server device 170, stored locally on the user device 120, and displayed for viewing by the user 102.

In one implementation, the service application 132 comprises interactive software that is downloadable to the user device 120. The user device 120 is configured to display service data and information tailored to particular machinery as designated by the user 102 via entry of a registry number of the particular machinery. Any user inputted data and information (e.g., damage findings for an airplane includes scribe line damage) may be categorized and stored in the user device 120. The user inputted data and information may be transmitted to the server device 170 via the network 150 and associated with the registry number of the machinery for storage in a database of the server device 188. This data and information may be associated with an appropriate work task assigned to the particular machinery. In various implementations, the information types may be multimedia in scope (e.g., single digit, T9, photo, formatted email, etc.). The resulting data and findings may be transmitted to one or more other server devices for long term activity performance recording and activity audit.

The user device 120, in one embodiment, may include one or more network interface applications 134, which may be used by the user 102 to display via a display component 140 (e.g., LCD) and view tasks in response to operations selected by the user 102. For example, the network application 134 may display a graphical user interface (GUI) in connection with the service application 132 for viewing of service tasks.

The user device 120, in various embodiments, may include other applications 136 as may be desired in particular embodiments to provide additional features available to the user 102. For example, such other applications 136 may include security applications for implementing client-side security features, programmatic client applications for interfacing with appropriate application programming interfaces (APIs) over the network 150 or various other types of generally known programs and/or applications.

The user device 120, in one embodiment, may include one or more databases 138 adapted to store and archive data and information including data and information from maintenance documents (e.g., advisory service bulletins). In various embodiments, the one or more databases 138 may comprise a removable memory component, such as a smart card, and/or an internal memory component, such as a ROM component. One or more sets of maintenance documents (e.g., AMM Part 1 & 2: Airplane Maintenance Manual: Part 1: Systems Description Manual and Part 2: Maintenance Practices and Procedures, IPC: Illustrated Parts Catalog, FIM: Fault Isolation Manual, Task Cards: Subset of AMM for use by Mechanic or Planner, MPD: Maintenance Planning Document, SRM: Structural Repair Manual, WDM: Wiring Diagram Manual, SSM: Systems Schematic Manual, CMM: Component Maintenance Manual, Engineering Blueprints: REDARS Parts Lists and REDARS Drawings, etc.) for machinery, such as an airplane, may be downloaded and stored on the user device 120 in database 138, which may comprise various types of memory components, such as an SD/SD micro memory card. In one aspect, the downloaded maintenance documents may be indexed in various ways using a unique indexer for optimization of fault information based retrieval. In various implementations, the indexer may use noun phrase collocation and simplified-English specific phrases and/or grammar for indexing and organization.

The server device 170, in one embodiment, may comprise a network server adapted to operate as an interactive data storage facility and communicate with the user device 120 via the network 150 by transmitting and receiving service data and information over the network 150. The server device 170 may be implemented using any appropriate combination of hardware and/or software configured for wired and/or wireless communication over the network 150. In one implementation, the server device 170 may be referred to as a service bulletin repository for recording service data and information (e.g., documents and/or files related to advisory service bulletins and service manuals) sent to and received from the user device 120. The server device 170 is configured to extract, format and provide relevant service data and information for transmission to and reception from the service application 132 of the user device 120.

The server device 170, in one embodiment, may include one or more server identifiers 180, which may be implemented, for example, as operating system registry entries, identifiers associated with hardware of the server device 170, or various other appropriate identifiers that identify the server device 170. The server identifier 180 may include attributes related to a company or organization that provides the server device 170 and/or an administrator or operator of the server device 170. The attributes may be implemented as security information (e.g., a company name, address or phone number, or operator name, password, photograph image or biometric id.). In various implementations, the server identifier 180 may be passed with a response to a user request, in a manner as described herein.

The server device 170, in one embodiment, may include a processing application 182, a network interface application 184, a data conversion application 186, and one or more databases 180. The network interface application 184, in one embodiment, may comprise a network communication device, module and/or application that allows the server device 170 to communicate with the user device 120 via the network 150 to transmit and receive service data and information.

The data conversion application 186, in one embodiment, may comprise a data conversion mechanism or module that allows translation of part identification numbers into user readable information that may reference maintenance, service and repair procedures from locally stored documents and/or files related to advisory service bulletins and/or service manuals. In one implementation, the user 102 may input into the user device 120 a part number from a particular part of the machinery, such as airplane, and access specific topics in the service manual for specific information related to maintenance, service and/or repair procedures for that specific part. This allows the user to quickly identify and research the particular part directly in data and information stored locally on the user device 120, such as a cell phone.

The database 188, in one embodiment, comprises one or more databases adapted to store and archive data and information including data and information from maintenance documents (e.g., advisory service bulletins and/or service manuals). One or more sets of maintenance documents (e.g., AMM Part 1 & 2, IPC, FIM, Task Cards, MPD, SRM, WDM, SSM, REDARS drawings, CMM's, REDARS Parts Lists, etc.) for machinery, such as an airplane, may be downloaded and stored on the user device 120 in database 138, which may comprise various types of memory components, such as a hard drive. The maintenance documents may be indexed in various ways using a unique indexer for optimization of fault information based retrieval. In various implementations, the indexer may use noun phrase collocation and simplified-English specific phrases and/or grammar for indexing and organization.

Figure 2:
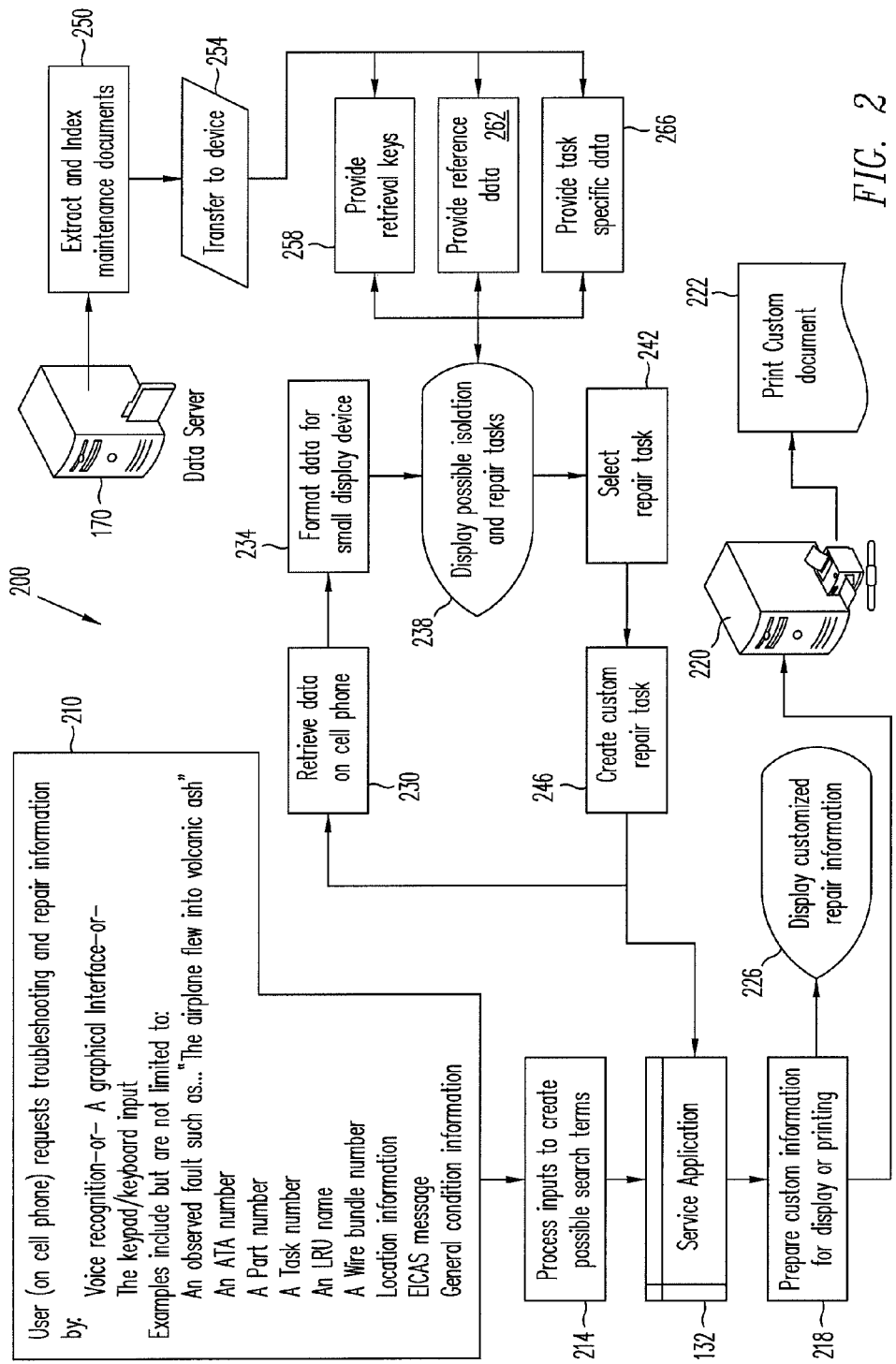
FIG. 2 shows a block diagram of a process for requesting and retrieving service data and information using the system of FIG. 1, in accordance with an embodiment of the present disclosure.

FIG. 2 shows one embodiment of a process 200 for requesting and retrieving service data and information using the system 100 of FIG. 1. The service data and information may include maintenance data and information, troubleshooting data and information, and/or repair data and information. As described herein, the server device 170 is adapted to transmit maintenance documents to the user device 120 for display and viewing by the user 102. The service application 132 allows the user 102 to retrieve task specific instructions from the maintenance document for display, viewing or printing. The service application 132 allows the user 102 to generate customized instructions locally. The service application 132 allows the user 102 to build specific, custom, repair task documents from the service data.

In one implementation, the user 102 inputs service request data and information to the user device 120 (block 210). The user 102 inputs the service request to the user device 120 via keypad/keyboard input, voice recognition or a graphical interface. In various examples, the user 102 may input at least one of an ATA number, a part number, a task number, an LRU name, a wire bundle number (e.g., using aerospace acronyms including RefDes), location information, EICAS message. In various other examples, the user 102 may input at least one of an observed fault and/or general condition information in common English language text, such as, "the airplane flew into volcanic ash," or "a bird flew into the engine," or "I had a bird strike."

The service application 132 processes the user input to generate one or more possible search terms (block 214). For example, the service application 132 may process the user request and search one or more maintenance document datasets stored locally in the database 138 of the user device 120 using custom indices. During processing and searching, the service application 132 may locate one or more applicable sections from the one or more maintenance document datasets.

After confirmation by the user 102 of at least one appropriate dataset (e.g., ATA number, Fault code, etc.), the service application 132 selects one or more sections of the maintenance document datasets applicable for the fault diagnosis and repair and builds a custom isolation and repair document from the complete dataset (block 218). For example, the service application 132 may select appropriate document pages from the AMN, FIM, IPC, SRM, WDM, SSM, Eng Drawing, etc., which may apply to a task associated with the fault and repair. The selected documents and related procedures may be sent to a local printer (block 220) for printing (block 226) on physical material, such as paper, or for viewing (block 226) on the user device 120.

In another implementation, referring to process 200 of FIG. 2, the service application 132 may retrieve service related data and information from the database 138 on the user device 120 (block 230) and format the retrieved service data and information for display on the user device 102 (block 234) via, for example, a small LCD screen. The service application 132 may display one or more service tasks (block 238), such as possible isolation and repair tasks. The service application 132 may then prompt the user 102 to select one or more appropriate service tasks (block 242), such as one or more appropriate repair tasks. The service application 132 may then create a custom repair task (block 246) based on the selection provided by the user 132.

In still another implementation, referring to process 200 of FIG. 2, the server device 170 is configured to transfer extract and index maintenance documents (block 250) to the user device 120 via, for example, the network 150 (block 254). The server device 170 may provide retrieval keys (block 258), reference data (block 262), and task specific data (block 266) along with or as part of the maintenance documents. In one aspect, the retrieval keys (block 258), reference data (block 262), and task specific data (block 266) allow the service application 132 to search the maintenance documents for specific tasks based on user input, as described herein.

FIG. 3A shows one embodiment of a method 300 for providing service information to the user 102. FIGS. 1 and 2 are referenced in the description that follows.

In one implementation, the server device 170 is adapted to receive an information request from the user 102 via the user device 120 (block 310). In one aspect, the requested information may include advisory service bulletin data and information and/or service manual data and information. The server device 170 is adapted to retrieve the requested data and information from the one or more databases 188 (block 314). In one aspect, retrieval may include selecting an appropriate advisory service bulletin for a specific airplane as provided by the user 102 via the user device 120. The server device 170 is adapted to provide the retrieved data and information to the user device 120 via the network 150 (block 318). In one aspect, the advisory service bulletin data and information may be packed or packaged (e.g., using a generally known data communication protocol) for transmission to the user device 102 via the network 150.

FIG. 3B shows one embodiment of a method 350 for receiving archival information from the user 102. FIGS. 1 and 2 are referenced in the description that follows.

In one implementation, the server device 170 is adapted to receive recorded information from the user 102 via the user device 120 (block 360). In one aspect, the recorded information may reference advisory service bulletins and include recorded responses and recorded results as inputted by the user 102 to status questions in reference to tasks related to advisory service bulletins. The server device 170 is adapted to store (e.g., archive) the received information in the database 188 for review (block 364). The server device 170 is adapted to provide an operator or an administrator with recorded responses and recorded results for review (block 368). For example, an operator may access the recorded data and information from the database 188 and view the data and information on a display component of the server device 170. In another example, the recorded data and information may be used for statistical analysis.

FIG. 4 shows one embodiment of a method 400 for viewing service information by the user 102. FIGS. 1 and 2 are referenced in the description that follows.

Figure 5A:
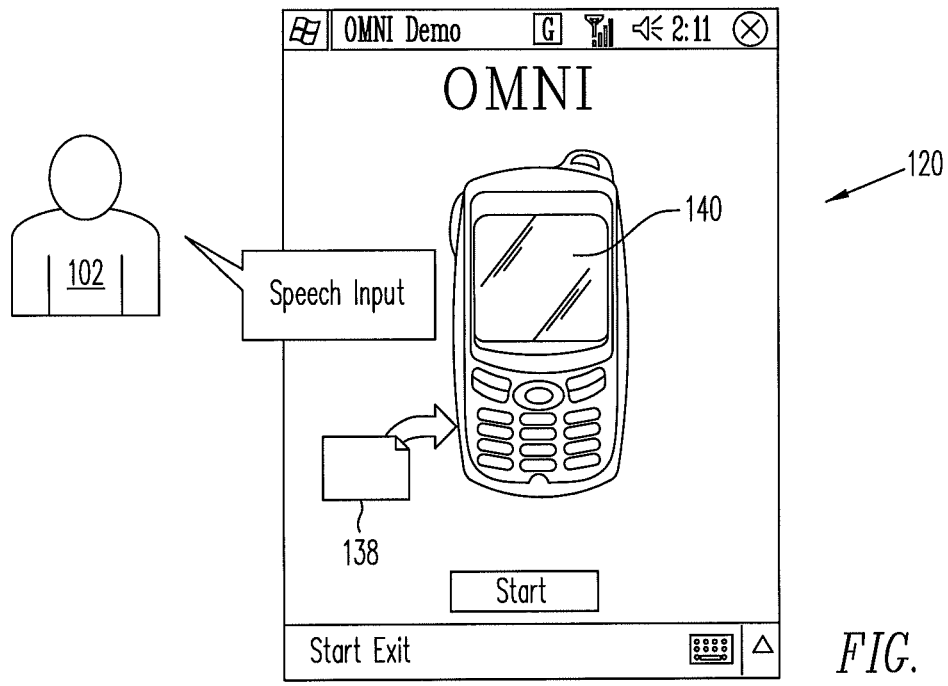

In one implementation, the service application 132 of the user device 120 is adapted to interface with the user 102 and request data and information from the server device 170 as requested by the user 102 (block 410). In one example, as shown in FIG. 5A, the user 102 may speak to the user device 120, such as a cell phone, and generate a request for data and information that may be transmitted to the server device 170 via the network 150. As previously described, the requested information may include advisory service bulletin data and information and/or service manual data and information.

The service application 132 is adapted to receive the requested data and information from the server device 170 via the network 150 (block 414). The service application 132 is adapted to unpack the data and information (e.g., using a generally known data protocol) and format the unpacked data and information for storage in the database 138 of the user device 120 (block 418). In one example, as shown in FIG. 5A, the user device 120, such as a cell phone, includes the removable database 138 to store data and information received from the server device 170 via the network 150.

The service application 132 is adapted to display the data and information to the user via the display component 140 of the user device 120 (block 422). In one example, as shown in FIG. 5A, the user device 120, such as a cell phone, includes the display component 140 to display data and information received from the server device 170 via the network 150.

Figure 5B:
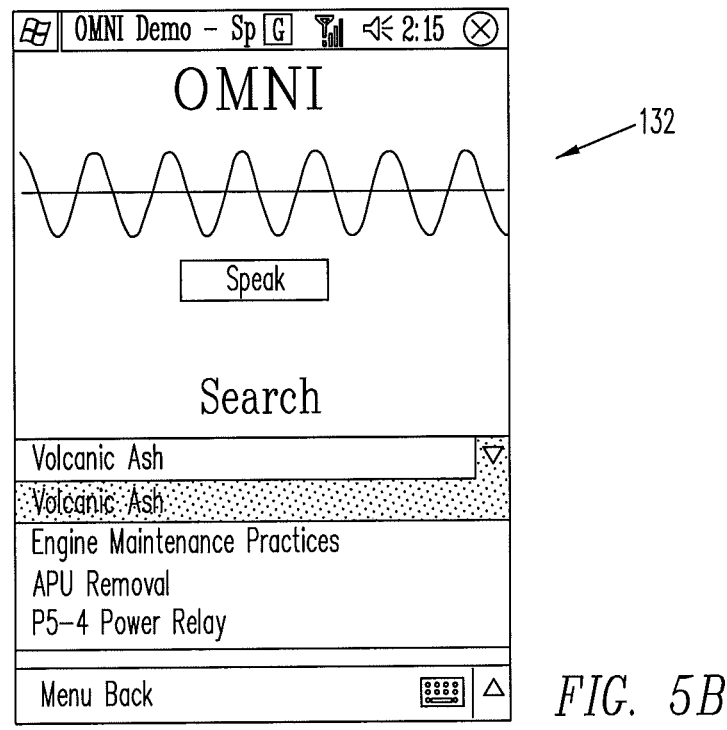

In one aspect, the requested data and information is interactively displayed and presented as a maintenance process guide that allows the user 102 to selectively view, search and/or select one or more portions of data and information from advisory service bulletins and/or service manuals downloaded from the server device 170 using the method 300 of FIG. 3A. In one example, as shown in FIGS. 5B-5C, the search application 132 of the user device 120 includes a search component that allows the user 102 to search and select topics from the data and information received from the server device 170 via the network 150.

Figure 5F:
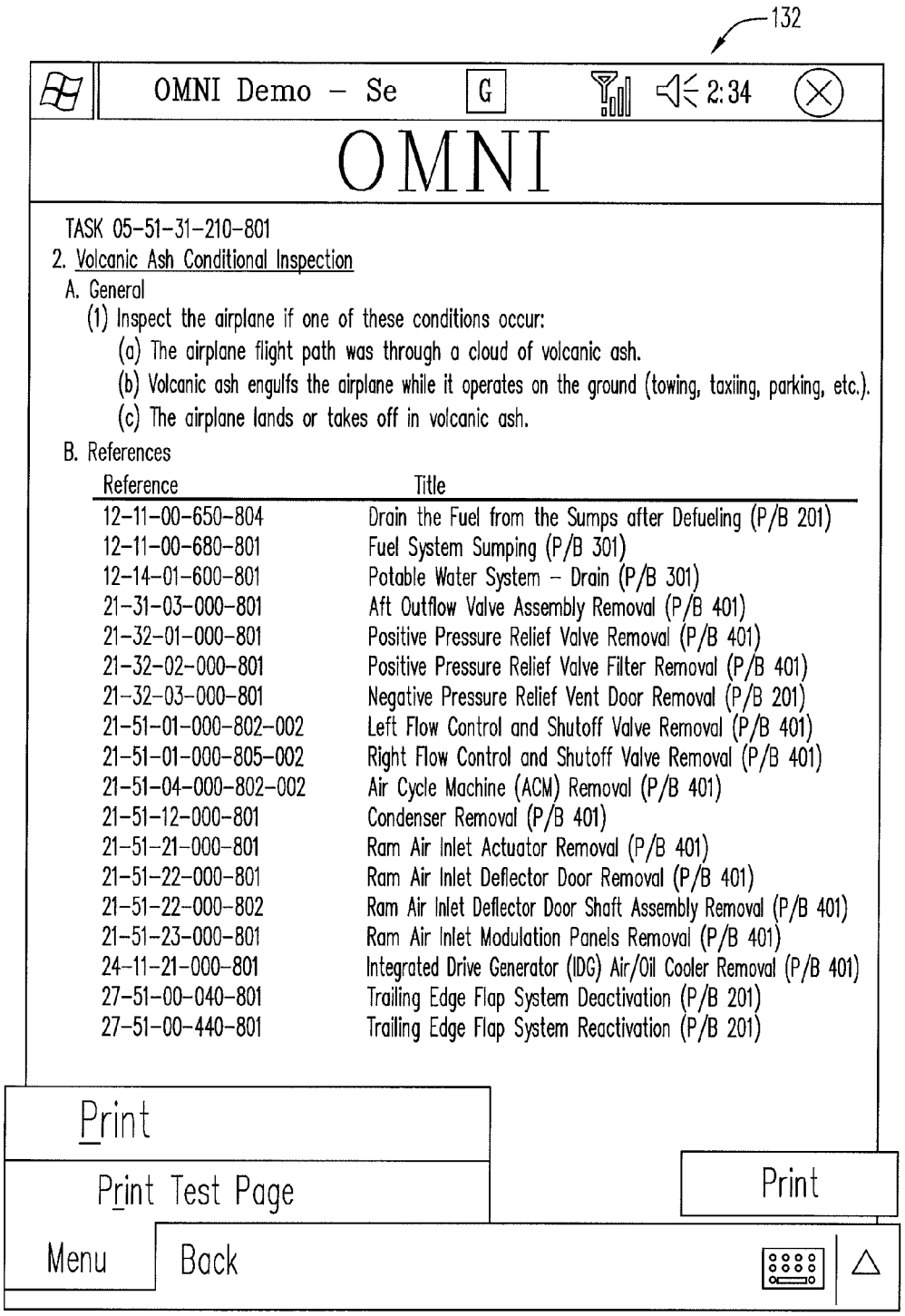

In another aspect, the interactively presented data and information provides procedural steps, reference support material and/or engineering data for maintenance, service and repair of machinery, such as an airplane. In one example, as shown in FIG. 5D, the search application 132 of the user device 120 allows the user 102 to search and select sub-topics, such as specific maintenance and inspection practices and procedures for selected topics, from the data and information received from the server device 170 via the network 150. As shown in FIGS. 5E-5F, portions of the data and information received from the server device 170 may be printed or viewed by the user 102. FIG. 5G shows one embodiment of a portion of the data and information received from the server device 170 that may be printed or viewed by the user 102.

Moreover, in various implementations, the service application 132 is adapted to record responses as inputted by the user 102 during an interactive session (block 426). In one aspect, the responses from the user 102 comprises data and information that may be stored in the database 138 of the user device 120. The service application 132 is adapted to format and package the recorded data and information for transmission to the server device 170 via the network 150 (block 430). In one aspect, data and information related to the recorded responses of the user 102 may be packed or packaged (e.g., using a generally known data communication protocol) for transmission to the server device 170 via the network 150.

Figure 6:
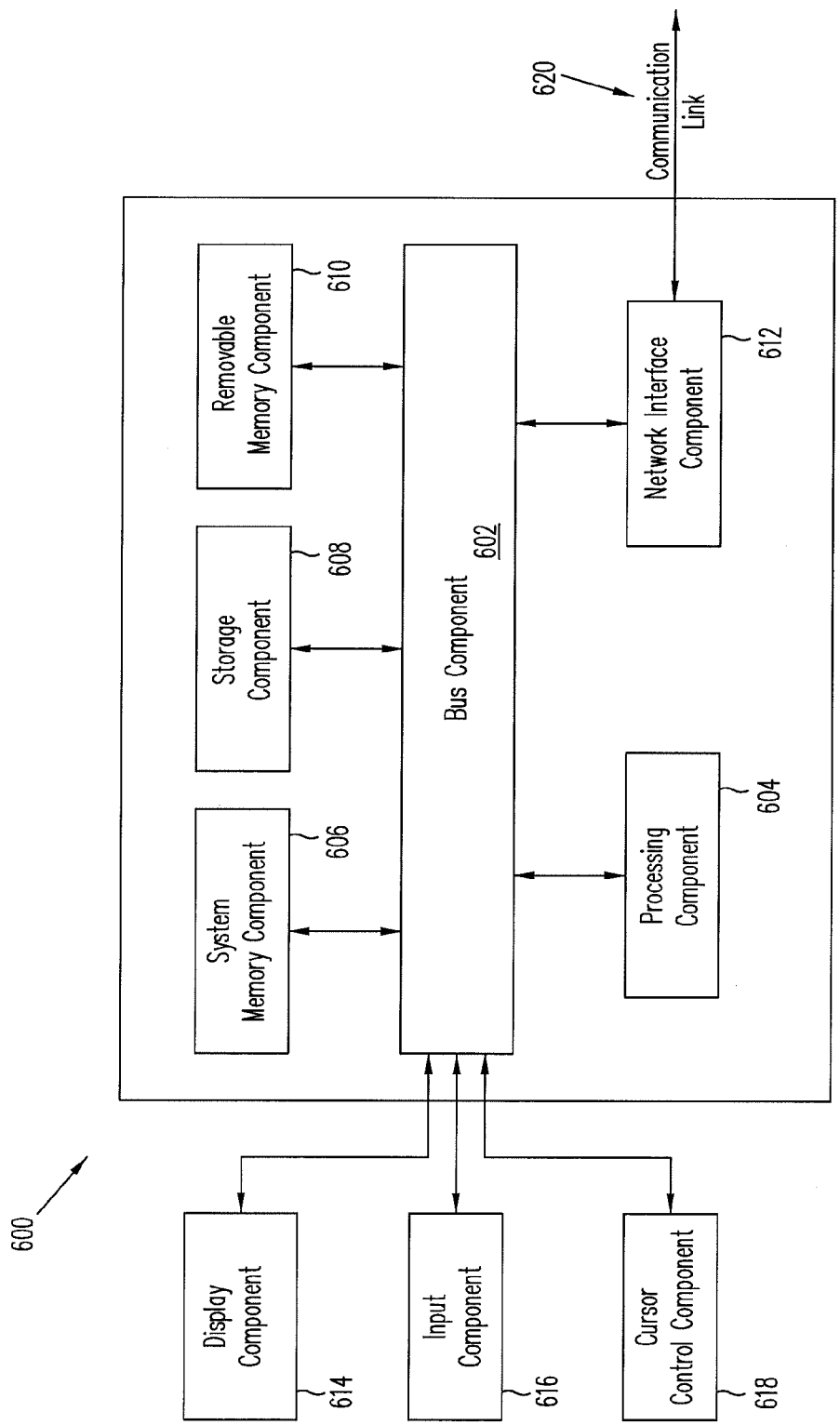
FIG. 6 is a block diagram of a computer system suitable for implementing one or more embodiments of the present disclosure.

FIG. 6 is a block diagram of a computer system 600 suitable for implementing embodiments of the present disclosure. Computer system 600 includes a bus 602 or other communication mechanism for communicating information, which interconnects subsystems and components, such as processor 604, system memory component 606 (e.g., RAM), static storage component 608 (e.g., ROM), removable memory component 610 (e.g., removable ROM memory, such as EEPROM, smart card, flash memory, etc.), wired or wireless communication interface 612 (e.g., transceiver, modem or Ethernet card), display component 614 (e.g., LCD), input component 616 (e.g., keyboard, microphone, touch screen on display), and cursor control component 618 (e.g., mouse button).

In accordance with embodiments of the invention, computer system 600 performs specific operations by processor 604 executing one or more sequences of one or more instructions contained in system memory component 606. Such instructions may be read into system memory component 606 from another computer readable medium, such as static storage component 608 or removable memory component 610. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes removable storage media, such as removable memory component 610, volatile media includes dynamic memory, such as system memory component 606, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the invention, execution of instruction sequences to practice the invention may be performed by computer system 600. In various other embodiments of the invention, a plurality of computer systems 600 coupled by communication link 620 (e.g., wireless cell phone network, wireless or wired LAN, PTSN, or various other wireless networks) may perform instruction sequences to practice the invention in coordination with one another.

Computer system 600 may transmit and receive messages, data, information and instructions, including one or more programs (i.e., application code) through communication link 620 and communication interface 612. Received program code may be executed by processor 604 as received and/or stored in removable memory component 610 or some other non-volatile storage component for execution.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for retrieving aircraft service information to facilitate custom aircraft repairs, the system comprising:
  a database component configured to store aircraft service documents;
  a communication component configured to communicate with a user via a portable communication device over a wireless network; and
  a processing component configured to respond to a spoken request by way of automatic voice recognition and to a textual request for aircraft maintenance data from the user via the portable communication device over the wireless network and process the spoken request and the textual request by accessing the aircraft service documents from the database component related to at least one component of an aircraft,
  wherein the communication component is configured to transfer selected one or more of the accessed aircraft service documents to the portable communication device,
  wherein the one or more transferred aircraft service documents are indexed using noun phrase collocation to create custom indices, and
  wherein the portable communication device is configured to:
    process the spoken request or the textual request from the user to generate one or more search terms, the spoken request or the textual request being related to a custom repair task for the aircraft,
    locate one or more sections from the one or more transferred aircraft service documents using the one or more generated search terms and the created custom indices, and
    create a custom repair document for the custom repair task using the one or more located sections of the one or more transferred aircraft service documents.

2. The system of claim 1, wherein the system comprises a server.

3. The system of claim 1, wherein the portable communication device comprises a display component that displays the custom repair document.

4. The system of claim 3, wherein the custom repair document is presented on the display component to provide the user with guided interactive inspection of the aircraft or the at least one component of the aircraft to accomplish the custom repair task.

5. The system of claim 1, wherein the portable communication device comprises a user input component to receive user input via key entry, voice recognition, and/or graphical interface.

6. The system of claim 1, wherein the spoken request or the textual request from the user processed at the portable communication device comprises at least one of a part number, a part description, a keyword, or English language description of an observed fault or condition.

7. The system of claim 1, wherein the portable communication device is further configured to receive data input from the user relating to completion of the custom repair task, store the data input in a portable database component, and transfer the data input to the system for storage in the database component.

8. The system of claim 7, wherein the data input from the user includes user answers to questions relating to the completion of the custom repair task and one or more recorded results to the questions are stored in the portable database component and transferred to the system for storage in the database component.

9. A method for retrieving aircraft service information to facilitate custom aircraft repairs, the method comprising:
- communicating with a user via a portable communication device over a wireless network;
- receiving a spoken request by way of automatic voice recognition or a textual request for aircraft maintenance data from the user via the portable communication device over the wireless network;
- searching a database component of stored aircraft maintenance manuals and service bulletins to retrieve one or more documents relating to an aircraft responsive to the user's request;
- transferring the one or more documents from the database component to the portable communication device;
- indexing the one or more transferred documents using noun phrase collocation to create custom indices;
- processing the spoken request or the textual request from the user received at the portable communication device to generate one or more search terms, the spoken request or the textual request being related to a custom repair task for the aircraft;
- locating one or more sections from the one or more transferred documents using the one or more generated search terms and the created custom indices; and
- creating a custom repair document for the custom repair task using the one or more located sections of the one or more transferred documents.

10. The method of claim 9, wherein at least part of the method is performed by a server in communication with the portable communication device via the wireless network.

11. The method of claim 9, further comprising displaying the custom repair document to the user via a display component of the portable communication device.

12. The method of claim 9, further comprising storing the one or more transferred documents.

13. The method of claim 12, further comprising providing the user with guided interactive inspection of the aircraft or at least a component of the aircraft.

14. The method of claim 9, wherein the spoken request or the textual request processed at the portable communication device comprises at least one of a part number, a part description, a keyword, or English language description of an observed fault or condition.

* * * * *